United States Patent [19]

Brown

[11] Patent Number: 5,081,207

[45] Date of Patent: Jan. 14, 1992

[54] POLY PYRROLE FROM CO/OLEFIN TERPOLYMER

[75] Inventor: Stephen L. Brown, Middlesex, England

[73] Assignee: The British Petroleum Company p.l.c., London, England

[21] Appl. No.: 528,579

[22] Filed: May 24, 1990

[30] Foreign Application Priority Data

May 31, 1989 [GB] United Kingdom ............... 8912430

[51] Int. Cl.$^5$ .............................................. C08G 67/02
[52] U.S. Cl. ................................................... 525/539
[58] Field of Search ......................................... 525/539

[56] References Cited

U.S. PATENT DOCUMENTS 3,979,374  9/1976  Kiovsky et al. ................... 526/12
4,824,910  4/1989  Lutz ................................. 525/539

FOREIGN PATENT DOCUMENTS 0324998  7/1989  European Pat. Off. .

Primary Examiner—Harold D. Anderson
Attorney, Agent, or Firm—Brooks, Haidt Haffner & Delahunty

[57] ABSTRACT

A nitrogen-containing polymer is prepared by reacting ammonia or an amine selected from $C_1$ to $C_{50}$ primary alkylamines, benzylamine and substituted benzylamines with a linear terpolymer comprised of alternating —CO— and —(A)— units, the —(A)— units comprising a mixture of —$CH_2CH_2$— units and —$CH_2CH(R)$— units wherein R is $C_1$ to $C_6$ alkyl or phenyl.

4 Claims, No Drawings

POLY PYRROLE FROM CO/OLEFIN TERPOLYMER

The present invention relates to new polymeric materials which are comprised, at least in part of units having the general formula

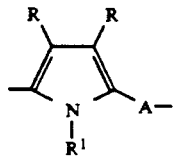

wherein A, R and $R^1$ are as defined herein. The present invention also relates to processes for the preparation of such new polymeric materials.

GB 1492172 discloses polymeric materials comprised in part of units of the above formula where both R groups are hydrogen, and —X— is —$CH_2CH_2$—. Such polymeric materials are made by treating ethylene/carbon monoxide copolymers with a strong acid e.g. concentrated sulphuric acid or trifluoroacetic acid.

U.S. Pat. No. 3,979,374 discloses polymeric pyrolic derivatives which are prepared by reacting an ethylene/carbon monoxide copolymer with a primary monoamine e.g. methylamine, ethylamine and the like in a solvent, e.g. m-creso or hexafluoroisopropanol. The materials disclosed have between 4% and 50% of their carbonyl groups converted into pyrrole groups.

J. Chem. Soc. Chem. Comm. 1989 p 965–966 and Macromolecules 1989 p 2012–2014 discloses similar derivatives of ethylene/carbon monoxide copolymers in which up to 88% of the carbonyl groups have been converted to pyrrole groups.

Finally, J Amer. Chem. Soc. (1954) p 6394–6399 discloses the reductive ammation of ethylene/carbon monoxide copolymers but does not teach the formation of pyrrole groups.

A family of pyrrolic derivatives of ethylene/alpha-olefin/carbon monoxide terpolymers has now been developed which it is believed will find use as a specialty plastic in the chemical industry. Possible uses for such materials include, for example, removal of metals from liquids or as supports for Group VII noble metal catalysts.

The ethylene/alpha-olefin/carbon monoxide terpolymers used in preparing the pyrrolic derivatives of the present invention have been disclosed in for example EP 213671.

According to the present invention there is provided a nitrogen-containing polymer prepared by reacting ammonia or an amine selected from $C_1$ to $C_{50}$ primary alkylamines, benzylamine and substituted benzylamines with a linear terpolymer comprised of alternating —CO— and (A) units, the (A) units comprising a mixture of —$CH_2CH_2$— units and units of formula —$CH_2CH(R)$— wherein R is $C_1$ to $C_6$ alkyl or phenyl.

Most preferred reactants for preparing the nitrogen-containing polymers of the present inventions are (1) ammonia and $C_1$ to $C_{20}$ primary alkylamines and (2) linear terpolymers comprised of alternating CO and (A) units where the (A) units are a mixture of —$CH_2CH_2$— and —$CH_2$—$CH(CH_3)$— or —$CH_2$—$CH(C_2H_5)$— units. Typically the molar ratio of the —$CH_2CH_2$— to —$CH_2CH(R)$— units in the terpolymer should be in the range 5:1 to 200:1 preferably 10:1 to 100:1.

The nitrogen containing polymers of the present invention are comprised of (a) the two pyrrole units

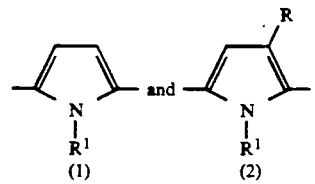

where $R^1$ is selected from hydrogen, $C_1$ to $C_{50}$ alkyl, phenyl or substituted phenyl, and (b) units of formula —$CH_2CH_2$— and —$CH_2CH(R)$—. Optionally the polymer may contain unreacted —CO— units provided that they comprise no more than 50 mole % preferably no more than 20 mole % of the number of —CO— units present in the original terpolymer. Since the ratio of —$CH_2CH_2$— to —$CH_2CH(R)$— units in the terpolymer is suitably in the range 5:1 to 200:1 it can be expected that in most cases the nitrogen-containing polymer will comprise more pyrrole units of formula (1) than pyrrole units of formula (2).

The polymers of the present invention are suitably prepared by reacting the linear terpolymer and the ammonia or amine at a temperature in the range 15° C.–150° C. (preferably 30° C.–100° C.) optionally in the presence of a solvent. For high temperature it may be necessary to carry out the reaction in a sealed vessel under an autogenous pressure of the contents. The terpolymer is suitably one prepared by the process disclosed in EP 213671 i.e, terpolymerization of ethylene, carbon monoxide and an alpha olefin of formula $RCH=CH_2$ in the presence of a phosphine modified palladium catalyst. However, it is contemplated that similar palladium catalyst systems carrying out essentially the same reaction could be used.

The invention is now illustrated by the following examples.

EXAMPLE 1

Preparation of Ethylene/Propylene/CO terpolymer

A 300 ml stainless steel autoclave was charged with methanol (100 ml) and the palladium complex [(Ph$_2$P(CH$_2$)$_3$PPh$_2$)Pd(PhCN)$_2$].2BF$_4$ (0.089 g). The autoclave was sealed and air was flushed out by pressurizing and venting three times with 3 bar of a 44:6:50 mole ratio mixture of ethylene, propylene and CO. After flushing the autoclave was pressurized to 50 bar with the same mixture and heated to 100° C. The autoclave was maintained at this temperature for three hours during which time more of the mixture was added to maintain a pressure of 50 bar. At the end of three hours the autoclave was cooled to room temperature and the excess pressure vented. 20.1 g of terpolymer (ethylene/propylene/carbon monoxide) was removed from the autoclave, along with the methanol and catalyst. The terpolymer was separated by

EXAMPLE 2

Preparation of Nitrogen-Containing Polymer 2.9 g of the terpolymer described above was charged to a 150 ml stirred stainless steel autoclave together with 30 mls of 25% aqueous methylamine. The autoclave was sealed and heated to 100° C. for eighteen hours during which time the contents were stirred. At the end of this time the autoclave was cooled to room temperature and the contents removed. The contents, a suspension of solid product in the liquid medium, were subjected to filtration to isolate the solid product. The solid product was then washed with 2×25 mls of distilled water and then dried at 100° C. to give 2.79 of a pale brown power containing 11.1% by weight nitrogen. Analysis by NMR indicated the presence of pyrrole units in the product.

EXAMPLE 3

Preparation of Nitrogen-Containing Polymer ($R^1 = C_{16}$)

The terpolymer of Example 1 (2.0 g) and hexadecylamine (10.21 g, 0.042 moles) together with $H_2O$ (30 ml) were heated to 120° C. for 17 h. The excess amine was then extracted by washing with 2×250 ml portions of acetone. The product was collected by filtration to give 3.738 g of a pale brown powdery solid.

CHN analysis 80.9% C, 12.3% H, 4.1% N.
m.p. 50° C.-55° C.

EXAMPLE 4

Preparation of Nitrogen-Containing Polymer ($R^1 = C_{18}$)

The terpolymer (1.5 g) and octadecylamine (6.0 g 0.22 moles) in 50 ml of $H_2O$ were heated to 120° C. for 16 h. The excess amine was extracted with 2×250 ml portions of acetone to give a brown solid. The product was collected by filtration and dried (Yield =4.35 g) CHN analysis 81.9% C, 12.5% H, 4.6% W, mp 60° C.-70° C.

I claim:

1. A nitrogen-containing polymer prepared by reacting ammonia or an amine selected from the group consisting of $C_1$ to $C_{50}$ primary alkylamines, benzylamine and substituted benzylamines with a linear terpolymer comprised of alternating —CO— and —(A)—units the —(A)—units comprising a mixture of —$CH_2CH_2$—units and —$CH_2CH(R)$—units wherein R is $C_1$ to $C_6$ alkyl or phenyl.

2. A nitrogen-containing polymer as claimed in claim 1 wherein the linear terpolymer is comprised of alternating —CO— and —(A)—units in which the —(A)— is a mixture of —$CH_2CH_2$— and —$CH_2CH(CH_3)$— or $CH_2CH(C_2H_5)$—.

3. A nitrogen-containing polymer prepared by the reaction defined in claim 1 and comprised of (a) pyrrole units of formula

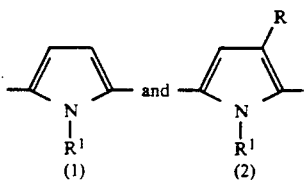

wherein $R^1$ is selected from hydrogen, $C_1$ to $C_{50}$ alkyl, phenyl or substituted phenyl and R is $C_1$ to $C_6$ alkyl or phenyl and (b) units of formula —$CH_2CH_2$— and —$CH_2CH(R)$—wherein (R) is $C_1$ to $C_6$ or phenyl alkyl.

4. A nitrogen-containing polymer as claimed in claim 3 further comprising —CO— units.

* * * * *

UNITED STATES PATENT AND TRADEMARK OFFICE
CERTIFICATE OF CORRECTION

PATENT NO. : 5,081,207

DATED : January 14, 1992

INVENTOR(S) : STEPHEN L. BROWN

It is certified that error appears in the above-identified patent and that said Letters Patent is hereby corrected as shown below:

Col. 1, l. 34, correct spelling of the word "disclose"

Col. 2, l. 61, after "separated by" insert --filtration washed with methanol and dried--.

Claim 2, line 3, strike "the" before -(A)-.

Claim 3, last line after "$C_6$" change "or phenyl alkyl" to --alkyl or phenyl.--

Signed and Sealed this

Twenty-seventh Day of April, 1993

Attest:

MICHAEL K. KIRK

*Attesting Officer*    *Acting Commissioner of Patents and Trademarks*